3,386,961
COPOLYESTER RESINS
Maria V. Wiener, Akron, Ohio, assignor to The Goodyear Tire & Rubber Company, Akron, Ohio, a corporation of Ohio
No Drawing. Filed Mar. 10, 1964, Ser. No. 350,655
11 Claims. (Cl. 260—75)

This invention relates to new copolyester resins. More particularly the invention relates to unique copolyesters of 2,6-naphthalic acid, ethylene glycol and terephthalic acid.

Highly polymeric polyethylene 2,6-naphthalate having an intrinsic viscosity above 0.6 possesses a very high melting point (283° C.) and extremely high melt viscosity, which make its use in shaped articles prepared by melt extrusion operations difficult. Furthermore, the polyethylene 2,6-naphthalate decomposes somewhat at temperatures around 300° C., and, as a result, products of this material prepared by melt extrusion operations have variable properties.

According to the present invention these limitative properties of the polyethylene 2,6-naphthalate homopolymers are improved by preparing copolyesters of ethylene 2,6-naphthalate and terephthalic acid. It is an object of this invention to provide highly polymeric polyethylene 2,6-naphthalate/terephthalate copolyesters having a high degree of polymerization which have properties that make them suitable for the preparation of products by melt extrusion operations. A further object is the provision of unique copolyesters of a lower melt viscosity than polyethylene 2,6-naphthalate of the same degree of polymerization and which have a glass transition temperature of above 80° C. A further object of the invention is the provision of new products such as films, fibers, coatings, adhesives and molded articles from the copolyester resins. Other objects will appear hereinafter as the description of the invention proceeds.

The copolyesters of the present invention are highly polymeric linear copolyesters of ethylene terephthalate-ethylene 2,6-naphthalate which contain from 70 to 5 mol percent of ethylene terephthalate and correspondingly from 30 to 95 mol percent of ethylene 2,6-naphthalate.

The copolyesters of the invention can be prepared by reacting a mixture of esters of the acids with ethylene glycol under ester interchange conditions in the presence of ester interchange catalyst and then condensing the mixture of the glycol esters formed by heating them at temperatures in the range of from about 245° C. to 285° C. in the presence of a condensation polymerization catalyst. The condensation polymerization reaction is carried out at low pressures in the range of from about one to five millimeters of mercury pressure and preferably below one millimeter of mercury pressure.

EXAMPLE

A glass reaction vessel in the shape of a tube approximately 35 centimeters long having an inside diameter of 38 millimeters, equipped with a side arm, a nitrogen gas inlet tube and a stirrer was charged with 17.1 grams of dimethyl 2,6-naphthalate, 5.8 grams of dimethyl terephthalate, 13.7 grams of ethylene glycol, 0.006 gram of zinc acetate and 0.005 gram of antimony trioxide. The mixture was stirred and heated by means of a vapor bath boiling at 245° C. while a slow stream of oxygen-free nitrogen gas was passed into the vessel and over the reaction mixture. During this time only the lower part of the reactor was heated so that the ethylene glycol gently refluxed while the methanol distilled over. After one and one-half hours under these conditions the ester interchange reaction was complete. At this point the entire reactor was heated at 245° C. and the pressure in the reactor was reduced over a period of 40 minutes to one millimeter of mercury pressure. The vapor bath boiling at 245° C. was replaced by another bath boiling at 282° C. The polycondensation reaction was carried out at 282° C. and one millimeter of mercury pressure for one and one-half hours. The copolyester resin obtained had an intrinsic viscosity of 0.72.

By regulating the proportions of the two different acid units used the crystalline and the amorphous characteristics of the polymer can be adjusted and the properties of the copolyester resins regulated. The copolyester resins are random materials which have high glass transition temperatures. Properly quenched articles of copolyesters of the invention which are made by rapidly cooling hot uncrystallized articles below the crystallization temperature of the resin can remain in the non-crystalline state indefinitely at ordinary temperatures. The copolyesters of the invention are capable of being oriented and the physical properties of films and fibers can be greatly improved by stretching under controlled conditions. The copolyesters of the invention have a lower density than does polyethylene terephthalate. Lower density in the amorphous state generally contributes to toughness and extended flex life. A comparison of melt viscosities of selected polyesters is listed in Table I.

TABLE I.—COMPARISON OF MELT VISCOSITIES AT 285° C.

| Polyester | IV | Approximate Melt Viscosity (poises) |
|---|---|---|
| Polyethylene terephthalate | 0.54 | 1,000 |
| Do | 0.83 | 10,000 |
| Do | 0.96 | 22,000 |
| Polyethylene 2,6-naphthalate | 0.67 | 22,000 |
| Polyethylene terephthalate/2,6 naphthalate, 30/70 mol percent | 0.63 | 10,000 |

Some of the physical properties of the copolyesters of the invention are tabulated in Table II.

TABLE II

| Mol percent Ethylene Terephthalate | Mol percent Ethylene 2,6-Naphthalate | Melting Point, ° C. | Glass Transition Temperature |
|---|---|---|---|
| 70 | 30 | | 86 |
| 60 | 40 | | 90 |
| 50 | 50 | | 95 |
| 40 | 60 | | 99 |
| 30 | 70 | | 102 |
| 10 | 90 | 265 | 110 |
| 5 | 95 | 275 | 111 |

Fibers can be made from the entire range of copolyesters and can be oriented, if desired. In fibers, it is usually desirable to have a crystalline structure and, therefore, the preferred fibers are made from copolyesters in the range from 5/95 ethylene terephthalate-ethylene naphthalate to 25/75 ethylene terephthalate-ethylene naphthalate, and particularly from 5/95 ethylene terephthalate-ethylene naphthalate to 15/85 ethylene terephthalate-ethylene naphthalate.

Films are made from the copolyesters of the invention by techniques similar to those employed with other linear condensation polymers such as polyesters. Thus, films can be made by melt extrusion or by casting film from a solution of the copolyester. Films so made can be oriented in one or more directions. For some purposes it is desirable to subject the film to biaxial orientation, e.g. by stretching the film in two directions at right angles to each other. Very useful films, which can be oriented or unoriented, as desired, can be made from copolyesters over the entire range of composition from 5/95 ethylene terephthalate-ethylene naphthalate to 70/30 ethylene terephthalate-ethylene naphthalate. When compositions which crystallize are employed for preparing of essentially non-crystalline films, melt-extruded films should be quenched to prevent crystallization. Essentially non-crystalline unoriented films will usually be made from copolyesters in the range of from 25/75 ethylene terephthalate-ethylene naphthalate to 70/30 ethylene terephthalate-ethylene naphthalate. The preferred range is from 25/75 ethylene terephthalate-ethylene naphthalate to 50/50 ethylene terephthalate-ethylene naphthalate. For some purposes it is desirable to make films from crystallizable copolyesters. Crystallizability is essential when the films are to be oriented and "heat set." Such films are made from copolyesters in the range from 5/95 ethylene terephthalate-ethylene naphthalate to 25/75 ethylene terephthalate-ethylene naphthalate, the preferred range being from 5/95 ethylene terephthalate-ethylene naphthalate to 20/80 ethylene terephthalate-ethylene naphthalate.

The compositions in the range of from 50/50 ethylene terephthalate-ethylene naphthalate to 70/30 ethylene terephthalate-ethylene naphthalate have better solubility than those containing higher ratios of ethylene naphthalate and the most preferred range for solution work is from 55/45 ethylene terephthalate-ethylene naphthalate to 60/40 ethylene terephthalate-ethylene naphthalate. Various organic solvents can be used. The difficultly crystallizable or amorphous resins in the range of 70/30 ethylene terephthalate-ethylene naphthalate to 25/75 ethylene terephthalate-ethylene naphthalate can be used to make strong laminates. For example, laminates can be made by inserting a film of copolyester between two layers it is desired to laminate and pressing and heating the composite article at a temperature above the sticking temperature of the resin being used. Very strong bonds can be formed. The polyesters of the invention adhere strongly to various substances and are excellent laminating agents for various materials such as glass, wood, paper and metals, particularly iron, steel, chromium, aluminum and copper.

Properties of unoriented films made from a 30/70 ethylene terephthalate-ethylene naphthalate copolyester are listed in the tables below.

TABLE III

| | L | T |
|---|---|---|
| Tensile Strength at Yield,[1] Pounds per square inch | 9,200 | 8,400 |
| Elongation at Yield,[1] percent | 5.0–6.0 | |
| Tensile Strength at Break,[1] Pounds per square inch | 7,400 | 6,800 |
| Elongation at Break,[1] percent | 68–115 | 78–98 |
| Elmendorf Tear, Grams per mil | 29 | 28 |

[1] Tested at 0.5 inch per minute.
L=Longitudinal; T=Transverse.

TABLE IV.—ELECTRICAL PROPERTIES

Dielectric constant at 100 cycles per second:
  2.96 at 24° C.
  3.16 at 81° C.
    (heated 15 min.)
  3.33 at 90° C.
    (heated 15 min.)
Dissipation factor at 100 cycles per second—percent:
  0.23 at 24° C.
  2.1 at 81° C.
    (heated 15 min.)
  3.9 at 90° C.
    (heated 15 min.)

The new copolyester resins have excellent physical properties. They can be processed into fibers, films or ribbons by melt extrusion processes. They can also be formed into coatings by solution methods or by powder techniques if desired. Also, they may be molded by conventional compression and injection molding apparatus. The resins have high softening points, high impact strength, and high tensile strength. These properties make them useful for various applications and particularly for applications where high strength and clarity are desired such as in safety glass and certain types of laminates. Films of the resins exhibit superior fold life. They have a high degree of solvent resistance and are suitable for use as electrical insulators where high strength and high melting temperatures are desirable.

While certain representative embodiments and details have been shown for the purpose of illustrating the invention it will be apparent to those skilled in this art that various changes and modifications may be made therein without departing from the spirit or scope of the invention.

I claim:

1. A random ethylene terephthalate-ethylene 2,6-naphthalate copolyester resin in which the ethylene terephthalate units comprise from 70 to 5 percent of the sum of the ethylene terephthalate and ethylene 2,6-naphthalate units and the ethylene naphthalate units comprise from 30 to 95 percent of said sum.

2. A random ethylene terephthalate-ethylene 2,6-naphthalate copolyester resin in which the ethylene terephthalate units comprise from 70 to 25 percent of the sum of ethylene terephthalate and ethylene 2,6-naphthalate units in the copolyester and the ethylene naphthalate units comprise from 30 to 75 percent of said sum.

3. A random ethylene terephthalate-ethylene 2,6-naphthalate copolyester resin in which the ethylene terephthalate units comprise from 25 to 5 percent of the sum of the ethylene terephthalate and ethylene 2,6-naphthalate units in the copolyester and the ethylene naphthalate units comprise from 75 to 95 percent of said sum.

4. The copolyester resin of claim 1 in the form of a film.

5. The copolyester resin of claim 2 in the form of an unoriented film.

6. The copolyester resin of claim 1 in the form of an oriented film.

7. The copolyester resin of claim 1 in the form of a unidirectionally oriented film.

8. The copolyester resin of claim 1 in the form of a biaxially oriented film.

9. The copolyester resin of claim 1 in the form of an oriented fiber.

10. The copolyester resin of claim 3 in the form of an oriented fiber.

11. A coated article comprising a base coated with the copolyester resin of claim 1.

References Cited

UNITED STATES PATENTS 1,950,468   3/1934   Zwiigmeyer _____ 260—75
3,123,587   3/1964   Hogsed _____ 260—75

WILLIAM H. SHORT, *Primary Examiner.*

R. T. LYON, *Assistant Examiner.*